Sept. 8, 1931.  W. E. JOHN  1,822,528
MOVING LENS CINEMATOGRAPH MACHINE
Filed Aug. 14, 1929
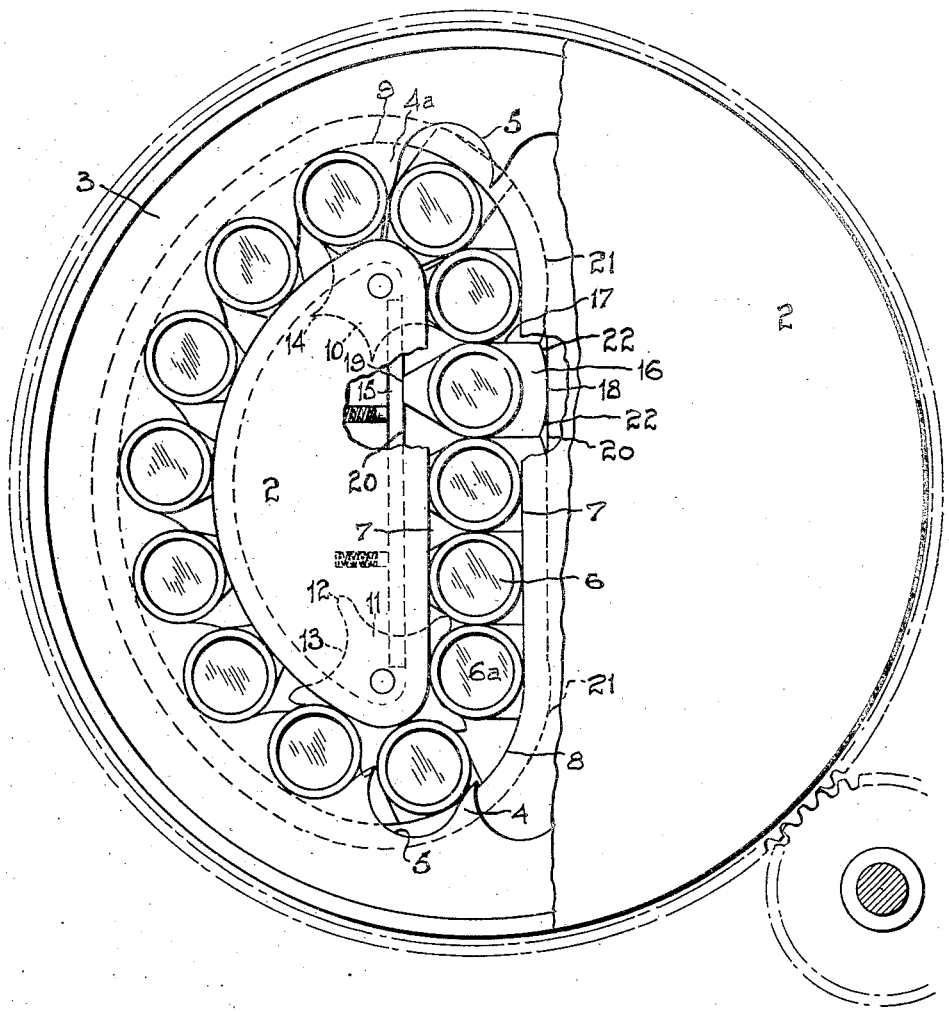
INVENTOR.
Wesley Ernest John,
Hervey Barber & McKee,
Attorneys;

Patented Sept. 8, 1931

1,822,528

UNITED STATES PATENT OFFICE

WESLEY ERNEST JOHN, OF JOHANNESBURG, TRANSVAAL, SOUTH AFRICA

MOVING LENS CINEMATOGRAPH MACHINE

Application filed August 14, 1929. Serial No. 385,747.

The present invention relates to cinematograph cameras or projectors having a continuously moving film and a series of loose lens carriers moving with the film. The loose lens carriers move through a closed circuit including a straight guide in which they are exposed, and curved guides, one at each end of the straight guide; the circuit between the curved guides being completed by a driving and conveying member such as an internally toothed and pocketed wheel.

This invention aims to improve the movement of the lens carriers in the curved guides by the reduction of friction and the prevention of jambing at those points.

The invention is illustrated in the accompanying drawing which shows a front view of a cinematograph projector, partly in section.

Therein 2 indicates a head upon which a wheel 3 is mounted to rotate, said wheel having internal teeth 4 and pockets 5. The lens carriers are indicated by 6. They circulate through a closed path including a straight guide 7 in which they are exposed and through which they move for instance downwardly: a curved outlet guide 8 from which they pass successively into the pockets 5 of the wheel: that segment of the wheel 3 shown on the left in which they are seated in the pockets 5 so as to be conveyed by the rotation of the wheel; and the curved guide 9 through which they are again passed from the wheel back to the straight guide 7.

The curves 8 and 9 have to be made somewhat sharp if the overall diameter of the apparatus is to be kept within reasonable limits. In order to reduce frictional resistance to the movement of the carriers, the inner peripheries of the curves are formed by freely rotatable wheels 10 and 11.

In the straight guide 7 and the adjacent parts of the curved guides 8 and 9 the carriers are detached from the wheel 3, and in order that their movement in the straight guide shall be exactly controlled by said wheel, it is necessary to maintain the whole line of carriers which occupies the straight guide and one of the curved guides, in close contact with one another and also to maintain said line in contact with a tooth of the wheel. The wheel 3 may either press the carriers in from above or up from below or it may simply control their exit. The first case is illustrated, the tooth 4a being the one which at the moment is driving forward the closely packed series of carriers extending from said tooth to the lower end of the straight guide 7.

In order to ensure that the carriers will pass through the curve 8 in the proper time for each to enter its proper pocket 5, their motion through this section is regulated and accelerated by means of the wheel 11. With this object said wheel 11 is formed with teeth 12 and pockets 13, fewer in number than would be necessary if the curve 8 were packed full of carriers. Its teeth 12 are correspondingly thickened so that, as it is rotated by the movement of the carriers 6 into and from it, one of its teeth comes behind the carrier 6a which is just leaving the straight guide 7 and displaces the same at an accelerated rate. The wheel 11 being quite free to rotate, accommodates its motion to that of the carriers which enter and leave it, and the carriers pass smoothly back into the wheel pockets 5 without danger of jambing occurring at that point. The wheel 10 may also have teeth 14, which however are sufficiently shallow not to interfere with the close packing of the carriers in the guide 9.

In order to ensure the maintenance of close contact between the carriers in the straight guide when they are moved downwardly, it is desirable to eliminate the influence of gravity upon them by providing a spring pressed guide section 15 which exerts a sufficient degree of frictional resistance on the descending carriers.

The carriers are generally of cylindrical form. It is found in practice, however, that inasmuch as the cylindrical form of the carriers provides only line contact both between the carriers themselves and between the carriers and their guides, the carriers either tend to rotate on their own axes or the line contacts almost immediately become worn into flats, thus destroying the precision of the machine. In order to retain the carriers against both axial and rotative movement, and to insure adequate bearing areas they are fitted with flanges 16. The edges 17 of said flanges provide the contact areas between the adjacent carriers and the edges 18, 19 provide engagement surfaces for sliding on the bottom of the grooves 20 provided for their accommodation in the straight guide. The wheels 10 and 11 are cut away at the centre of their length to allow the flanges to pass them. These flanges are utilized, according to the invention, to maintain the carriers in a fixed radial position relatively to the centres of the curves 8 and 9 while they are passing around said curves. If they are so maintained there is no danger of the carriers becoming jambed as they pass out of the curves.

With this object the ends of the grooves are further cut back as the arcs 21 centred at the centre points of the guides 8 and 9. The extremities 22 of the edge 18 of each flange are curved and positioned to fit said arcs so that in passing around the curves each carrier is positively constrained at three points namely the points 22, 22 and that point at which it touches the inner surface of the curved guide,—this being in the example shown, the bottom of the pockets in the wheels 10 and 11.

Claims:

1. In a moving film cinematograph machine, the combination of a series of loose lens carriers, a straight guide in which the lenses are exposed, a curved guide at each end of the straight guide, continuously moving driving means for feeding carriers into one of the curved guides, and receiving them from the other curved guide, the carriers being in close contact with one another in the straight guide and one of the curved guides so that the driving means controls their rate of movement through the straight guide, and an externally toothed wheel so engaging the carriers in the other curved guide as to space said carriers from one another and to accelerate their movement therein.

2. In a moving film cinematograph machine, the combination of a series of loose lens carriers, a straight guide in which the lenses are exposed, a curved guide at each end of the straight guide, an internally toothed and pocketed wheel arranged to receive carriers from one curved guide and feed them to the other curved guide, a series of the carriers comprising one touching a tooth of the wheel, those in one of the curved guides and those in the straight guide being in close contact with one another, and freely movable means for spacing out the carriers in the other curved guide.

3. In a moving film cinematograph machine, the combination of a series of loose lens carriers, a straight vertical guide in which the lenses are exposed, means for feeding the carriers into the guide from above and receiving them therefrom, and a resiliently supported friction shoe forming a portion of the straight guide and operative on the carriers for restraining their movement in said guide.

4. In a cinematograph machine, the combination of means forming an endless guide channel including a straight portion and a curved portion at each end of said straight portion, a series of independent lens carriers mounted in said channel, means for moving the carriers in a direction transverse to their axes through said channel, each of said carriers having a partially rectangular flange in contact with the walls of said guide channel and providing bearing surfaces between adjacent carriers.

5. In a cinematograph machine, the combination of guide members forming between them an endless guide channel including a straight portion merging at its opposite ends into curved portions, said guide members having opposing grooves in communication with said channel, a series of independent lens carriers mounted in said channel, means for moving said carriers in juxtaposition through the straight portion and one of the curved portions of said channel, and means carried by each of the carriers in engagement with said grooves and operative to retain the carriers against both axial movement and rotary movement on their respective axes.

6. In a cinematograph machine, a plurality of independent lens carriers each provided with a flange having portions extending from diametrically opposite sides thereof, the portion at one side having parallel side edges and an end edge connecting said side edges, said end edge being of a length approximately equal to the diameter of the lens carrier, and the flange portion at the opposite side of the carrier having converging side edges and a comparatively short end edge connecting said side edges.

7. In a cinematograph machine, a plurality of independent lens carriers each provided with a flange having portions extending from diametrically opposite sides thereof, the portion at one side having parallel side edges and an end edge connecting said side edges, said end edge being of a length approximately equal to the diameter of the lens carrier and curved adjacent to its points of intersection with the side edges, and the flange portion at the opposite side of the carrier having converging side edges and a comparatively short end edge connecting said side edges.

In testimony whereof I affix my signature.

WESLEY ERNEST JOHN.